United States Patent [19]

Uchida

[11] 3,806,817

[45] Apr. 23, 1974

[54] TUNING SYSTEM

[75] Inventor: Kosaku Uchida, Neyagawa-shi, Japan

[73] Assignee: Matsushita Electric Industrial Co., Ltd., Osaka, Japan

[22] Filed: Dec. 6, 1971

[21] Appl. No.: 204,827

[30] Foreign Application Priority Data

Dec. 7, 1970 Japan ............................ 45-109221
Dec. 7, 1970 Japan ............................ 45-109222
Dec. 7, 1970 Japan ............................ 45-109223

[52] U.S. Cl. ........... 325/418, 178/7.3 DC, 325/464, 325/471, 334/16

[51] Int. Cl. ............................................ H04b 1/16

[58] Field of Search ........................... 325/416–418, 325/422, 464–469, 471; 178/7.3 R, 7.3 DC, 5.8; 334/14–16

[56] References Cited

UNITED STATES PATENTS 3,619,492 11/1971 Evans ................................ 325/522

*Primary Examiner*—Robert L. Griffin
*Assistant Examiner*—Marc E. Bookbinder
*Attorney, Agent, or Firm*—Stevens, Davis, Miller & Mosher

[57] ABSTRACT

An automatic AFT suppressor circuit comprising a source of channel change-over signal and a switching element, is incorporated in an r-f receiver which has a tuner circuit with a varactor diode and an AFT circuit to automatically suppress or stop the automatical fine tuning action of the AFT circuit for a certain duration of time after the power switch is put on which connects or disconnects a power source for the r-f receiver used as the source of channel change-over signal. Also, when such an appratus as a motor is used as a channel change-over mechanism for the r-f receiver, a voltage to be applied to the apparatus is used as the source of channel change-over signal, so that the automatic fine tuning action is suppressed while the channels are being changed over.

10 Claims, 18 Drawing Figures

TUNING SYSTEM

The present invention relates to a tuning system, and more particularly to a self-assured tuning system or automatic fine tuning (referred to hereafter as an AFT) system which is used for an r-f receiver having an AFT action performed by a tuner finished with a varactor diode and which can prevent the erroneous pull-in of undesired channels when a channel is changed over.

In the conventional tuning system for use in a television receiver, the frequency pull-in range of the AFT system is made wide enough to respond to the variation in the local oscillator frequency. With increasing pull-in range, however, it would occur that if the receiver is powered with the AFT circuit already energized it will be tuned to an undesired channel during the transient time that the tuning voltage applied to the varactor diode of the AFT circuit rises gradually after the closure of the power switch, which makes the proper tuning to a predetermined channel impossible. There have hitherto been proposed no effective means for solving this kind of problem. Moreover, with such a conventional tuning system, there is left a drawback that the change-over from one channel to another sometimes stumbles even if the receiver is in its steady state due to a lapse of time after the closure of the power switch or that the reproduced picture fluctuates transiently even if the change-over is performed rather smoothly. Conventionally, there has been used a method to overcome such an inconvenience as seen above, in which a mechanical switching means is used not only to change-over the reception channels but also to temporarily disconnect the AFT circuit loop from the receiver circuit. According to this method, however, the structure of the mechanical switch is necessarily complicated and this adversely affects the production cost of the switch and therefore the completed receiver set. Further, the mechanical structure is not preferable from the standpoint of the reliability and the longevity of the switch.

Moreover, the mechanical switch produces sounds offensive to the ears and noises due to the make and break of the contacts when operated to change-over the channels. Also, it may happen that the channel change-over operation does not get synchronous with the time during which the AFT action is being suppressed. Therefore, a new method and apparatus have to be resorted to in order to eliminate all these difficulties the conventional method has not yet overcome.

It is an object of the present invention to provide a new tuning system having an AFT function by the use of a varactor diode incorporated therein which system is used in such a radio-frequency receiver as, for example, television receiver and prevents a wrong channel from being pulled in when a particular channel is desired to be received by channel change-over operation.

Another object of the invention is to provide a tuning system furnished with a varactor diode to perform the AFT function which system is used in a receiver and prevents the erroneous pull-in of an undesired channel apt to take place in the transient build-up process of a voltage applied to the varactor diode following immediately the closure of the power switch.

An additional object of the invention is to provide a tuning system which can prevent an inconvenience that an undesired channel is pulled in when a channel under reception by the receiver in its steady state is changed over to another desired one.

A further object of the invention is to provide a tuning system including an automatic AFT suppressor circuit with which a manually operated AFT switch can easily be combined.

A still further object of the invention is to provide a tuning system which is free from the erroneous pull-in phenomena as mentioned above resulting in a smooth and secure operation, gives rise to no harsh sound and harmful noise ascribable to the conventional channel change-over mechanism, and is small in size, light in weight and low in cost.

Therefore, according to the present invention an automatic AFT suppressor circuit consisting of a source of channel change-over signal and a switching element is provided in a receiver. The voltage of the power source for the receiver is used as the source of channel change-over signal. And the automatic AFT suppressor circuit automatically and momentarily suppress the AFT action for a certain period of time immediately after the closure of the power source so as to prevent a wrong channel from being pulled in instead of a desired one. If a channel selector employing an electric motor that is actuated by electric power to perform channel change-over operation or another type of channel selector that performs channel change-over operation by the direct application of a voltage is used, the power source for the channel selector is used as the source of channel change-over signal. Also, the voltage of the power source is applied to the automatic AFT suppressor circuit to automatically suppress the action of the AFT circuit during the channel change-over operation and to prevent the erroneous pull-in of an undesired channel. Moreover, a varactor diode provided in the tuner section of the receiver plays a major role in the AFT action.

Means that can serve as the above mentioned source of channel change-over signal are as follows.

First, the power source for feeding the receiver will do. For since the tuning voltage applied to the varactor diode of the tuner builds up during the transient period from after the closure of the power switch till the steady-state operation of the receiver, the channels are successively changed over.

Secondly, a power source which supplies a channel change-over voltage for a channel selector, which is used to perform the change-over operation by the direct application of the channel change-over voltage, can serve as the source of channel change-over signal. This case is different from the first one in that the channel change-over now takes place where the receiver is in its steady state.

Thirdly, a variation in the voltage or in the frequency, which is caused in the channel selector if a channel is changed over to another by any means, can be used as the channel change-over signal.

Other features and advantages of the present invention will be apparent from the following description taken in conjunction with the accompanying drawings, in which.

Figure 1:
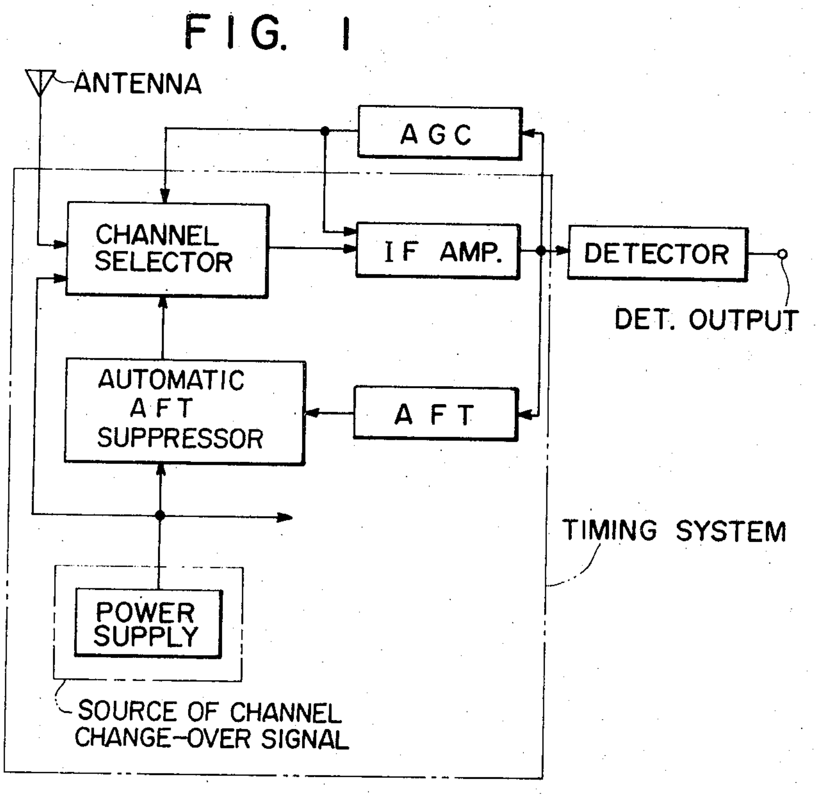
FIG. 1 is a block diagram of a tuning system embodying in general the present invention.

A generalized embodiment of the present invention is shown in FIG. 1. In this figure, an r-f signal received at an antenna is tuned to a desired channel by means of a channel selector and the channel selector delivers an IF signal to be fed to an IF amplifier. The output of the IF amplifier is then applied to an AGC (automatic gain control) circuit to be converted to a gain control signal which is in turn fed back to the channel selector and the IF amplifier so as to control their gains. The output of the IF amplifier is passed also to a detector whose output is fed to, for example, a video circuit, chrominance circuit, audio circuit or synchronizing circuit of a color television receiver. The third output of the IF amplifier is applied to an AFT circuit and frequency-discriminated there to provide a frequency control signal which is in turn fed to an automatic AFT suppressor circuit. The automatic AFT suppressor circuit automatically and momentarily suppresses or blocks the frequency control signal from the AFT circuit being applied to the channel selector when the suppressor circuit receives a signal from a source of channel change-over signal. The channel selector includes a tuner using therein a varactor diode as a tuning element and, if necessary, may incorporate therein a channel selecting circuit to switch over tuning voltages to be applied to the varactor diode and/or a motor to drive the channel selecting circuit. The source of channel change-over signal generates a signal indicating that one channel is about to be or being changed over. For example, a voltage available from a power supply source through the closure of the power switch can be utilized as such a channel change-over switch. Also, in case where the channel selector includes a motor for driving the channel selection circuit, the power voltage applied to the motor can be used as the channel change-over signal.

Figure 2:
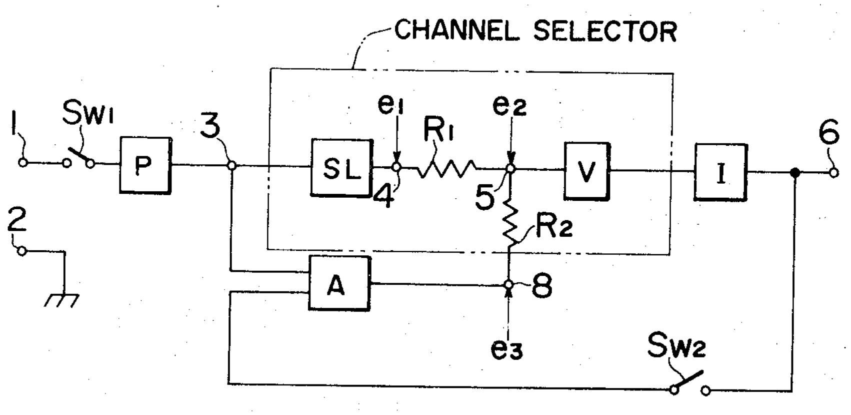
FIG. 2 is a block diagram of the conventional tuning system, which is shown herein to illustrate the difference thereof from the tuning system according to the present invention.

FIG. 2 shows an example of the conventional tuning system employed in an r-f receiver. With this type of tuning system having an AFT function, the AFT action often causes an undesired channel to be pulled in the transient build-up process of the tuning voltage applied to the varactor diode in the tuner after the closure of the power switch, with the result that a desired channel cannot be received. In order to better understand the embodiments of the present invention, the operation of the tuning system shown as a conventional example in FIG. 2 will be explained by reference to FIGS. 3, 4, 5 and 6.

In FIG. 2, terminals 1 and 2 are input terminals to be connected with the commercial power lines. $SW_1$ is a power switch of, for example, a television receiver and a box labeled P is a power circuit of the receiver, consisting of a rectifier circuit and a filter circuit. A channel selecting circuit SL applies tuning voltages corresponding to predetermined channels to a terminal 5 where the tuning voltages are applied to a varactor tuner V. A box labeled I is an IF amplifier to amplify the IF output from the varactor tuner V and a box labeled A is an AFT circuit which receives the output of the IF amplifier, frequency-discriminates the picture carrier from the output, and dc-amplifies it. $SW_2$ is a switch to connect and disconnect the circuit which leads the output of the IF amplifier to the AFT circuit.

Figure 3:
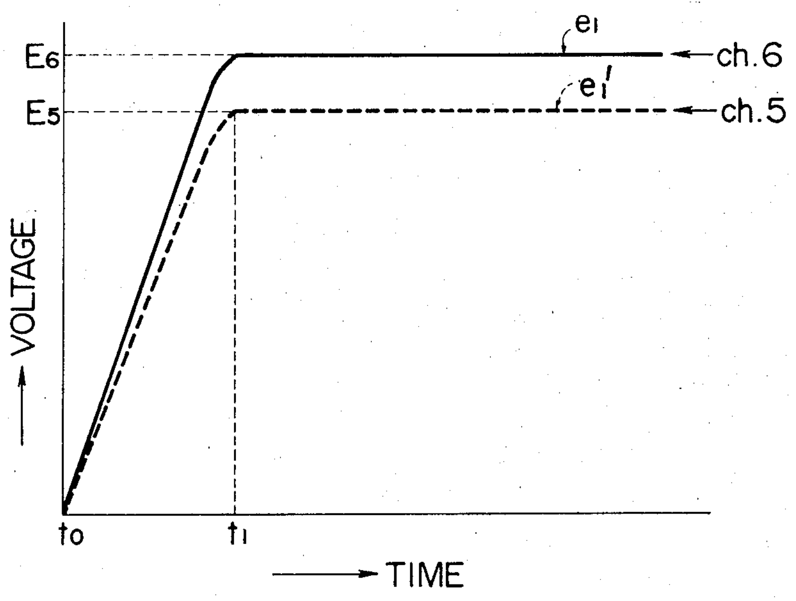
FIGS. 3, 4, 5 and 6 illustrate graphically the various characteristics of the conventional tuning system shown in FIG. 2.
Figure 4:
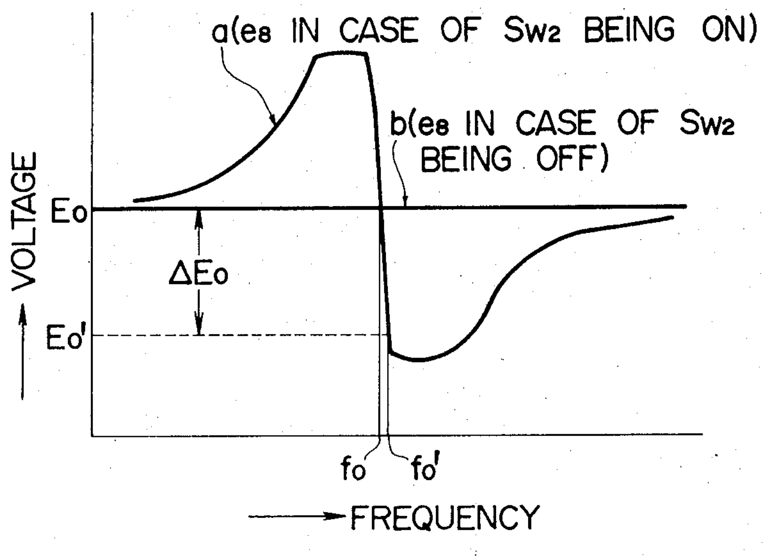

Upon the closure of the power switch $SW_1$ the source voltage is applied through the power circuit P to the channel selecting circuit SL and the AFT circuit. The voltage $e_1$ appearing at the output terminal 4 of the selecting circuit SL gradually rises with the passing of time after the closure of the power switch $SW_1$, as seen in FIG. 3, and reaches a saturation value corresponding to a channel, say, tuning voltage $E_6$ corresponding to channel 6 (hereafter notations such as ch-1, ch-2, ....., ch-6, ....., etc. are employed to denote channels 1, 2, ....., 6, ....., etc.). A plurality of predetermined tuning voltages corresponding to respective channels are preset in the channel selecting circuit SL and the change-over of these tuning voltages can be done manually or by means of an electric motor. Therefore, if the channel selecting circuit is in the position of ch-5, which corresponds to a voltage level lower than that of ch-6, then the voltage $e_1'$ appearing at the terminal 4 follows the dashed curve in FIG. 3 and reaches a saturation value, i.e. the tuning voltage $E_5$ corresponds to ch-5. The tuning voltage $e_1$ or $e_1'$ is applied through a resistor $R_1$ to the tuning terminal 5 of the varactor tuner V. Also, the output of the AFT circuit A is applied through a resistor $R_2$ to the terminal 5 to be superposed on the voltage $e_1$ or $e_1'$ there. The values of the resistors $R_1$ and $R_2$ can be selected such that $R_1 << R_2$. And if the resistors $R_1$ and $R_2$ are so determined, the voltage $e_2$ available at the terminal 5 is the sum of the voltage $e_1$ at the terminal 4 and the voltage obtained through attenuation by the resistor $R_2$ of the voltage $e_3$ available at the output terminal 8 of the AFT circuit A. The voltage $e_3$ appearing at the terminal 8 of the AFT circuit A, as seen in FIG. 4, follows curve *a* if the switch $SW_2$ is closed but curve *b* (linear portion) if the switch $SW_2$ is open. It is therefore clear that the function of the AFT circuit A can be performed while the switch $SW_2$ is closed whereas that function cannot be performed or is suppressed while the switch is open.

In FIG. 4, $f_0$ indicates a standard IF picture carrier frequency; $f_0'$ another IF picture carrier frequency slightly higher than $f_0$: $E_0$ the reference voltage of the AFT circuit A, which appears at the output terminal 8 of the AFT circuit A when the carrier frequency is $f_0$ with the switch $SW_2$ closed and when the switch $SW_2$ is open no matter what frequency the carrier may take. $E_0'$ designates the output voltage of the AFT circuit A which corresponds to the frequency $f_0'$ and is lower by $\Delta E_0$ than $E_0$.

Figure 5:
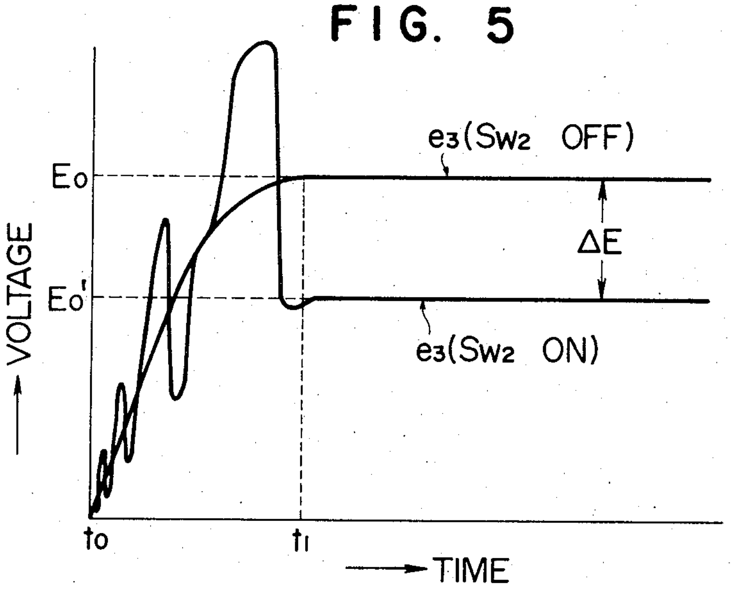

FIG. 4 shows the output voltage of the AFT circuit A after a sufficiently long time since the power switch has been closed. However, the behavior of the output voltage from the AFT circuit A immediately after the closure of the power switch is shown in FIG. 5. Namely, as seen in FIG. 3, the voltage $e_1$ continues to increase between the time $t_0$ at which the power switch gets closed and a succeeding time $t_1$, resulting in corresponding increase in the local oscillator frequency of the varactor tuner V. The channels of broad casting consists of a plurality of channels ranging from lower to higher frequencies, each channel having its own center frequency and being separated by a certain frequency interval from adjacent channels. Therefore, when the power switch $SW_1$ is closed, the frequencies appearing in the IF band of the receiver sweep one frequency range corresponding to one channel after another frequency range corresponding to another channel, each frequency range being swept from lower to higher frequencies and overall sweep beginning with the lowest frequency channel followed by higher frequency channels. Therefore, as see in FIG. 5, if the switch $SW_2$ is closed with the switch $SW_1$ closed, an oscillating output voltage of the frequency discriminator is superposed on the build-up portion of the reference voltage, which is obtained when the switch $SW_2$ is open or off, to provide a composite voltage following a curve for $e_3$ with $SW_2$ on.

From this superposition phenomenon it is deduced that if the switch $SW_1$ is closed with the switch $SW_2$ closed a certain proportion of voltage $e_3$ is superposed on voltage $e_1$ to provide a composite voltage $e_2$ following a curve for $e_2$ with $SW_2$ on.

Figure 6:
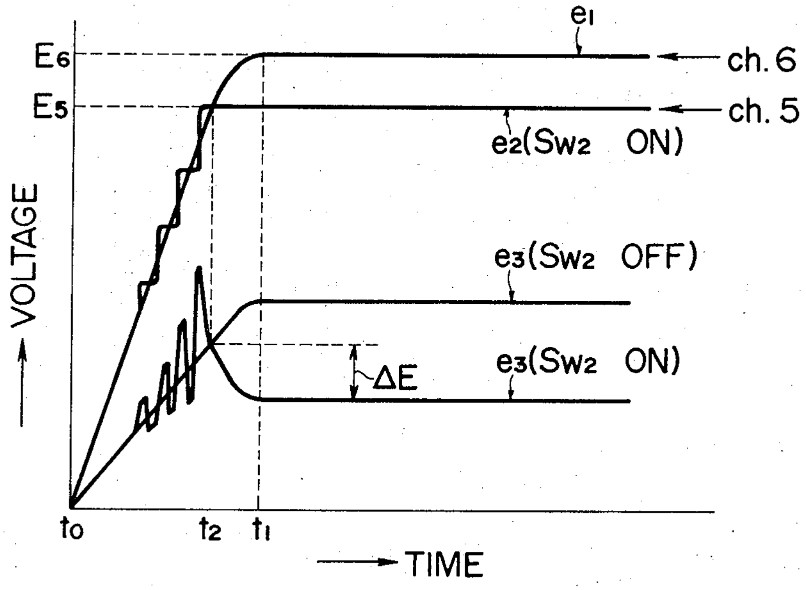

As seen in FIG. 6, the voltage $e_1$ reaches at time $t_2$ the tuning voltage $E_5$ for ch-5 and further increases to reach at time $t_1$ the tuning voltage $E_6$ corresponding to ch-6, and thereafter the voltage $e_1$ rests at that value $E_6$. On the other hand, the voltage $e_2$, which has the voltage $e_3$ delivered from the discriminator when the switch $SW_2$ is closed superposed thereupon, increases following a curve in the shape of a stair and reaches the level $E_5$ simultaneously with the arrival of the voltage $e_1$ at the tuning level $E_5$ for ch-5. Thereafter, the voltage $e_3$ decreases by $\Delta E$ according as the IF carrier frequency shifts from $f_0$ to $f_0'$, as seen in FIG. 4, and the decrement in the voltage $e_3$ cancels a further increase in the voltage $e_1$. Accordingly, the increase in the voltage $e_2$ in excess of the level $E_5$ corresponding to ch-5 vanishes. In the proper operation of the receiver ch-6 should be received since the voltage $e_1$ is at the tuning level $E_6$ corresponding to ch-6. However, ch-6 cannot sometimes be received because the AFT circuit operates as soon as ch-5 has been received. This undesired phenomenon does not always take place but does in response to a certain status of the output characteristic of the AFT circuit A and the local oscillator frequency-voltage characteristic of the varactor tuner V.

Figure 7:
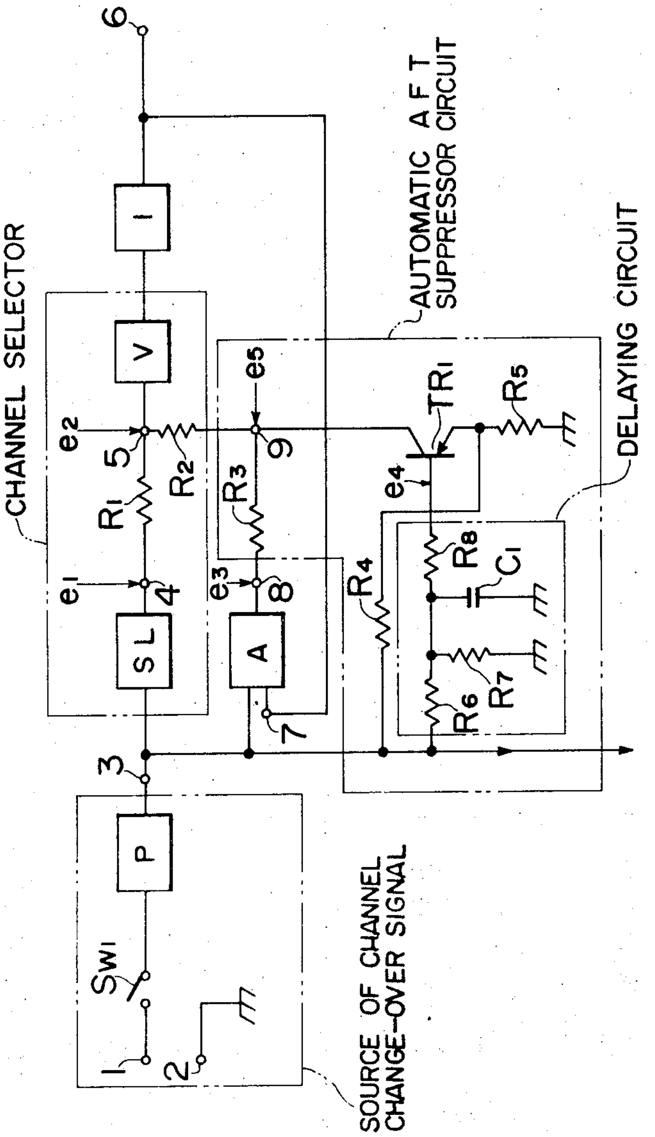
FIG. 7 is a schematic circuit diagram of a tuning system as one embodiment of the present invention.

The present invention has been made to eliminate the aforementioned drawbacks and will first be described in conjunction with FIG. 7 which shows a first embodiment thereof. As seen from FIG. 7, the circuit therein is different from that shown in FIG. 2 only in that it further includes an automatic AFT suppressor circuit. Also, in the circuit shown in FIG. 7 the power switch $SW_1$ and the power circuit P in combination serves as a source of channel change-over signal.

The automatic AFT suppressor circuit comprises resistors $R_3$, $R_4$, $R_5$, $R_6$, $R_7$ and $R_8$, a capacitor $C_1$, and a transistor $TR_1$. The transistor $TR_1$ serves as a switching transistor to momentarily suppress the output of the AFT circuit. The AFT voltage appearing at the output terminal 8 of the AFT circuit A is applied to the channel selecting terminal 5 of the varactor tuner V via the resistors $R_3$ $R_2$. With the junction point 9 of the resistors $R_3$ and $R_2$ is connected the collector of the transistor $TR_1$, the emitter of which is connected with a reference voltage $E_0$ obtained at the junction of the resistors $R_4$ and $R_5$ which constitute a voltage divider to splitting the voltage available at the power output terminal 3 into a fractional part. If the transistor $TR_1$ is driven conductive, the voltage at the junction point 9 is locked to $E_0$. As a result, the function of the AFT circuit A is and continues to be suppressed until the transistor $TR_1$ has been cut off. Upon the cut off of the transistor the AFT circuit resumes its function. In the steady state operation the base of the transistor $TR_1$ is maintained at a certain constant voltage which is obtained by dividing the power voltage by means of the resistors $R_6$ and $R_7$. With this constant voltage the transistor $TR_1$ is not conductive, as is necessitated by the circuit design.

Upon the closure of the power switch $SW_1$ the potential $e_4$ at the base of the transistor $TR_1$ rises gradually starting from the earth potential. The velocity of this rise in the base potential $e_4$ depends on the time constant determined by the combined effect of the resistors $R_6$, $R_7$, $R_8$ and the capacitor $C_1$. In this embodiment the build-up velocity of the base potential $e_4$ is set slower than that of the power voltage. Namely, the resistors $R_6$, $R_7$, $R_8$ and the capacitor $C_1$ constitute a delay circuit. The build-up velocity of the emitter potential of the transistor $TR_1$ is approximately equal to that of the power voltage. Consequently, the transistor $TR_1$ continues to be conductive until the base potential $e_4$ reaches a certain threshold level $E_s$. While the transistor $TR_1$ is conducting, the AFT circuit A is shunted by a circuit consisting of the resistor $R_4$ and the transistor $TR_1$ (emitter-collector path) so that its function is suppressed. The voltages $e_1$ and $e_2$ have approximately the same build-up time as the power voltage so that they reach near, for example, the tuning voltage $E_6$ for ch-6, that is, reach the stable region, at a time $t_1$ prior to time $t_d$ when the voltage $e_4$ reaches the level $E_s$, as seen in FIG. 8.

Figure 8:
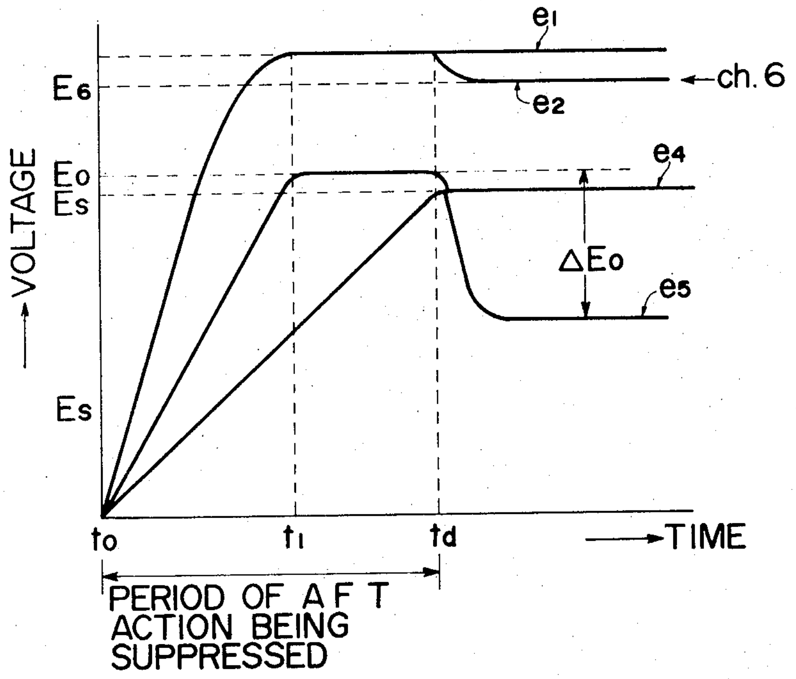
FIG. 8 shows graphically a voltage characteristic of the embodiment shown in FIG. 7 to illustrate the operation thereof.

In FIG. 8, since the transistor $TR_1$ is conductive before the base potential $e_4$ has reached the level $E_s$, the collector voltage $e_5$ rises in almost the same manner as the emitter voltage does and then rests at the level $E_0$. At time $t_d$ when the base voltage $e_4$ reaches $E_s$, the collector voltage $e_5$ falls down to a level lower by $\Delta E_0$ than $E_0$ and finally rests at that level. The magnitude polarity of $\Delta E_0$ is determined by the quantity of the shift of the IF carrier frequency from the value $f_0$. In this way, the AFT circuit A starts operating after the completion of the build-up time of the power voltage, i.e. after the time $t_d$, and therefore the voltage $e_2$ at the junction 5 rests at the tuning level $E_6$ for ch-6 after the time $t_d$ with the result that there is eliminated a drawback which would be met with a conventional tuning system.

As apparent from the foregoing description, according to the present invention, the AFT voltage is prevented from being applied to the varactor diode for a certain period of time just after the closure of the power switch, and this AFT suppressing action is automatically released at the end of the period so that the AFT function may be performed. Accordingly, mistuning which is liable to occur at the time of power switching in will be prevented and any desired channel can securely be tuned to.

Figure 9:
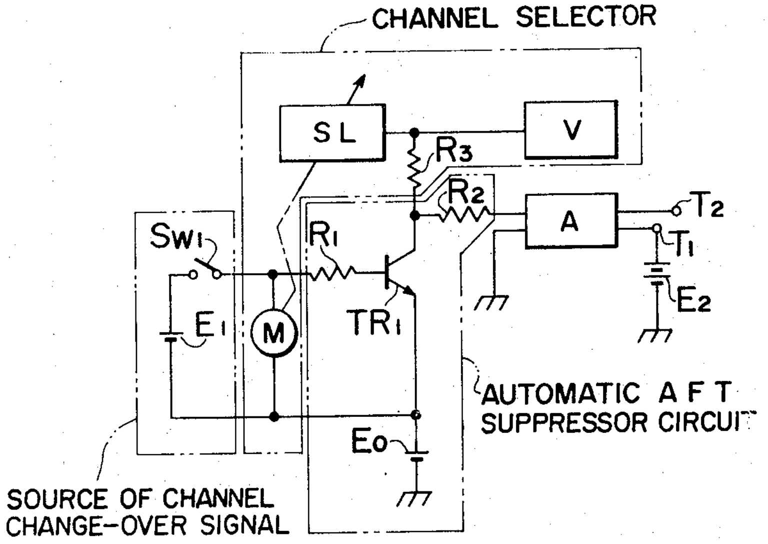
FIG. 9 is a schematic circuit diagram of a tuning system as another embodiment of the present invention.

FIG. 9 shows a second embodiment of the present invention. In this embodiment a channel selector has a motor and a source of motor driving power and its associated switch are included in a section to serve as a source of channel change-over signal. A switching transistor and resistors connected therewith constitute an automatic AFT suppressor circuit. This embodiment permits of avoiding the inconvenience that the channel is not smoothly changed over when the receiver is in its steady state and the AFT circuit is also in operation or that even if the channel change-over took place smoothly the first appearing picture experiences the transient fluctuation.

Figure 10:
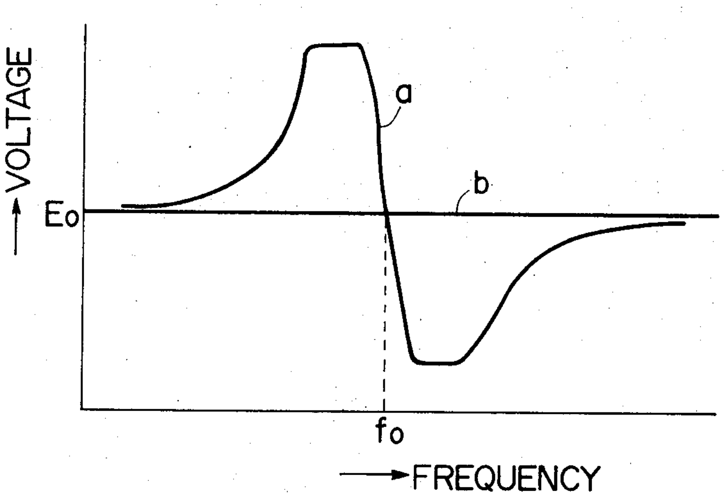
FIG. 10 shows in graphical fashion a voltage-frequency characteristic of the embodiment shown in FIG. 9 to illustrate the operation thereof.

In FIG. 9, $E_1$ indicates a power source for feeding a motor and at the same time the voltage of the power source. M designates a motor; $SW_1$ a switch for controlling the energization and deenergization of the source for feeding the motor; $R_1$ is a resistor to connect the voltage applied to the motor with the base of a transistor $TR_1$ and to prevent excessive base current; V a varactor tuner having a varactor diode, which determines a channel to be received by utilizing the bias voltage vs. electrostatic capacitance characteristic of the diode; SL a channel selecting circuit which is driven by said motor M to supply in a changing-over operation tuning voltages corresponding to predetermined channels for said varactor tuner; and A an AFT circuit to generate such an output voltage as shown in FIG. 10, one of the output terminals of which, i.e. $T_1$ is connected with a power source while the other output terminal $T_2$ receives IF picture carrier, said output voltage being applied through the resistor $R_2$ and $R_3$ to said varactor tuner V.

The operation of this embodiment shown in FIG. 9 will next be described. In normal operation the AFT circuit A delivers an output voltage following curve *a* shown in FIG. 10. Namely, if the frequency of the IF picture carrier deviates from the standard value $f_0$, the AFT circuit A delivers a voltage corresponding to the deviation, which voltage is applied to the varactor tuner V so as to perform AFT (automatic fine tuning) action. In this operation, the $SW_1$ is open and therefore the transistor $TR_1$ is not conducting.

Then, the closure of the switch $SW_1$ drives the motor M into rotation to change the value of the tuning voltage delivered from the channel selecting circuit SL. The changed tuning voltage is in turn applied to the varactor tuner V to produce a condition that the channel change-over operation is about to be performed. Simultaneously with this the voltage of the power source for the motor M is applied through the resistor $R_1$ to the base of the transistor $TR_1$ to render it conductive. Consequently, the junction of the resistors $R_2$ and $R_3$ is maintained at the reference voltage $E_0$ (represented by a linear curve *b* in FIG. 10) applied to the emitter of the transistor $TR_1$ and the output of the AFT circuit A is not applied to the varactor tuner V. Namely, the varactor tuner V receives only the tuning voltage delivered from the channel selecting circuit SL so that channels can be easily changed over.

Immediately a desired channel has been selected by actuating the motor M, the switch $SW_1$ is opened. Simultaneously with this the base potential of the transistor $TR_1$ falls to be accompanied by the cut-off thereof so that the output of the AFT circuit A is again applied through the resistors $R_2$ and $R_3$ to the varactor tuner V to resume the AFT action.

Figure 11:
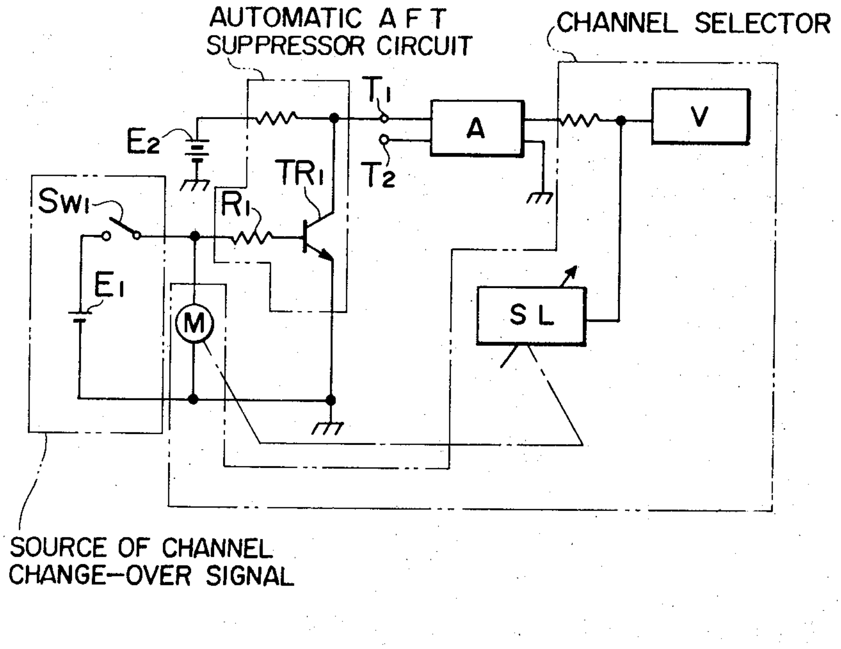
FIGS. 11, 12, 13, 14 and 15 are schematic circuit diagrams of tuning systems which are the variations of the tuning system shown in FIG. 9.

The embodiment shown in FIG. 11 is a variation on that shown in FIG. 9, where the same reference characters have been applied to like circuit elements. By the connection of the collector of the switching transistor $TR_1$ with the dc power terminal $T_1$ of the AFT circuit A, the terminal $T_1$ is grounded through the transistor in conduction while the motor M is being powered so that the AFT circuit A has its function suppressed. Accordingly, the channel change-over operation is easily and securely performed.

Figure 12:
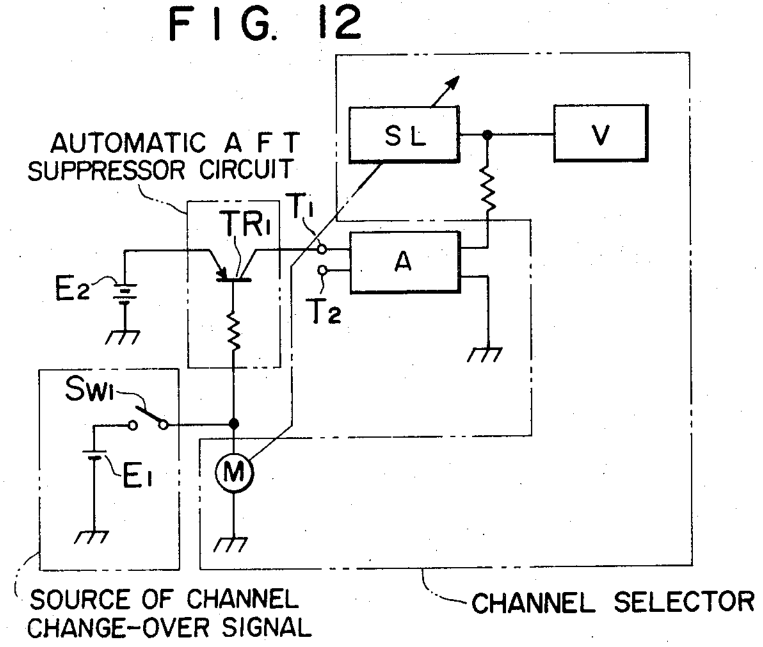

The embodiment shown in FIG. 12 is another vatiation on that shown in FIG. 9, wherein the same reference characters are applied to like circuit elements. In this embodiment, current flows into the base of the transistor $TR_1$ through the exciting coil of the motor M when the switch $SW_1$ is open, and the transistor $TR_1$ is conducting so that the voltage of the power source $E_2$ is applied to the AFT circuit A. On the other hand, when the switch $SW_1$ is closed, the base potential of the transistor $TR_1$ is elevated to render the transistor $TR_1$ non-conductive so that the power source $E_2$ is disconnected from the AFT circuit A. Thus, this embodiment operates in a manner similar to that shown in FIG. 9.

Figure 13:
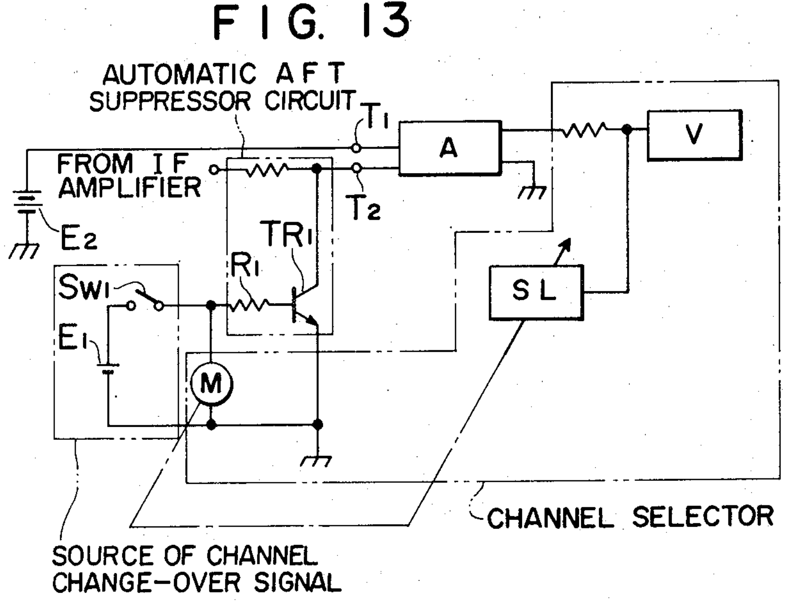

The embodiment shown in FIG. 13 is a third variation on that shown in FIG. 9, wherein also the same reference characters indicate like circuit elements. In this embodiment, by the connection of the collector of the switching transistor $TR_1$ with the terminal $T_2$ of the AFT circuit to which the IF picture carrier is applied, the transistor $TR_1$ is conducting while the motor M is powered. Accordingly, the application of the IF picture carrier to the AFT circuit A is suppressed so that the AFT action is also suppressed. Thus, the present embodiment provides the same result as that shown in FIG. 9.

Figure 14:
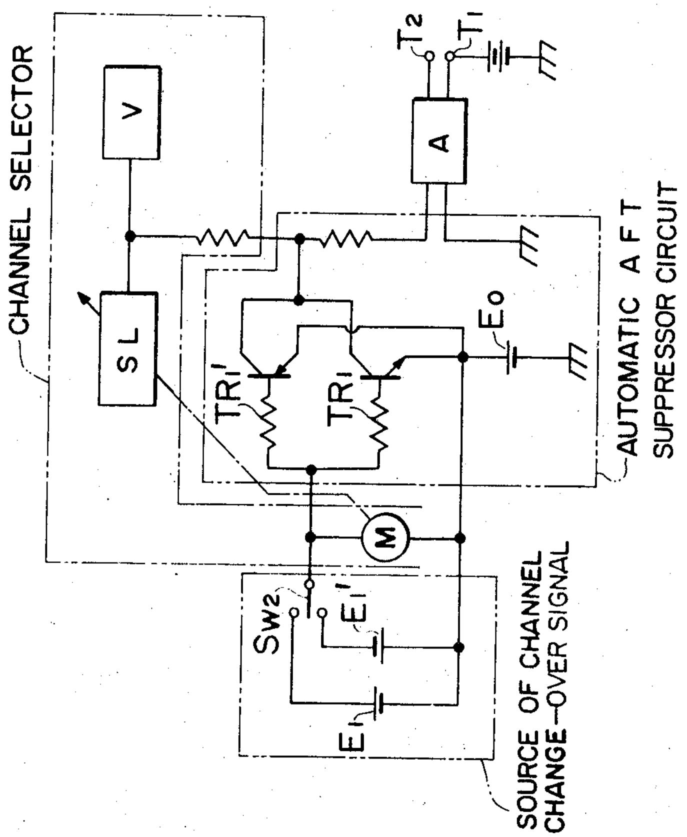

The embodiment shown in FIG. 14 is a fourth variation on that shown in FIG. 9, in which the same reference characters designate like circuit elements. In this embodiment, the $SW_2$ permits of the forward and reverse rotations of the motor M by switching over the positive and negative voltage sources $E_1$ and $E_1'$. The switching transistors $TR_1$ and $Tr_1'$ operate in response to these voltages. The description of operation of this circuit is omitted since it is analogous to the operation of the embodiment shown in FIG. 9.

Figure 15:
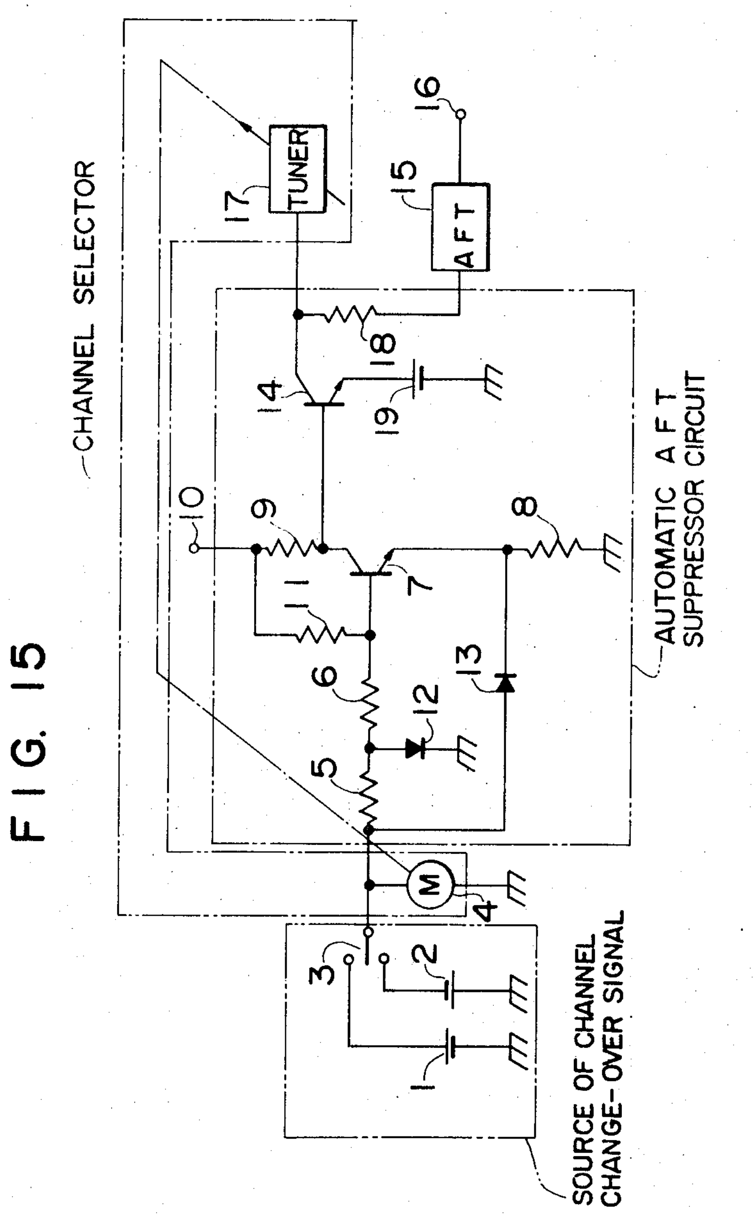

The embodiment shown in FIG. 15 is a fifth variation on that shown in FIG. 9 and also a variation on the embodiment shown in FIG. 14. In FIG. 15, reference numeral 1 indicates a positive voltage source with its negative pole grounded while a negative voltage source 2 has its positive pole grounded. A switch 3 selects from among these voltages in change-over operation. A motor 4 can rotate in the clockwise and counterclockwise directions depending upon which of the positive and negative voltage sources 1 and 2 is connected by means of the switch 3. Resistors 5 and 6 connect the switch 3 with a transistor 7. The transistor 7 has resistors 8, 9 and 11 connected respectively with its emitter, collector and base. The other ends of the resistors 9 and 11 are connected together with a collector terminal 10. A diode 12 serves to lead the negative voltage from the source 2 to the base of the transistor 7 as well as to conduct the positive voltage from the source 1 to the ground. Also the diode 12 prevents the current flowing through the resistors 6 and 11 to provide a positive bias for the base of the transistor 7 from drawn to the motor 4 so that the adverse influence by the current on the rotation of the motor 4 may be avoided. A diode 13 serves to prevent the negative voltages from the source 2 from being applied to the emitter of the transistor 7 as well as to lead the positive voltage from the source 1 to the emitter of the transistor 7. The diode 13 also prevents the motor 4 from being adversely affected by the positive voltage at the emitter of the transistor 7. A transistor 14 has a dc source having reference voltage $E_0$ connected between its emitter and the ground. An AFT circuit 15 frequency-discriminates the output of the IF amplifier received at its input terminal 16 and generates a frequency control voltage which changes positively or negatively with respect to the reference voltage $E_0$ depending upon the deviation of the IF picture carrier frequency from the value $f_0$. A tuner 17 includes the channel selecting circuit SL and the varactor tuner as shown in FIG. 14 together and the channel changeover operation is resorted to the rotational force of the motor 4. A predetermined tuning voltage (not shown in the figure) and the output of the AFT circuit 15 through a resistor 18 are applied to the tuner 17.

The operation of the embodiment with the aforementioned constitution will now be described. If a particular channel is already selected, that is, the switch 3 is open, the motor 4 is not powered at all. Accordingly, the motor 4 is at rest and the base of the transistor 7 is maintained at a constant bias voltage by means of the resistors 6 and 11. So the transistor 7 is conducting so that the switching transistor 14 is cut off since its base potential is lowered. As a result, the output of the AFT circuit 15 is applied through the resistor 18 to the varactor diode provided in the tuner 17, thus resulting in the AFT action to secure the reception of a desired channel.

Now, if the switch makes circuit with the voltage source 1, the motor 4 rotates, for example, clockwise so that a higher frequency channel may be selected. The voltage from the source 1 is applied through the diode 13 to the resistor 8 to elevate the potential at the emitter of the transistor 7. Accordingly, the transistor 7 conducts so that the transistor 14 also conducts. As a result, the output of the AFT circuit 15 no longer appears at the tuning voltage terminal of the tuner 17 and the AFT action is suppressed.

On the other hand, if the switch 3 makes circuit with the voltage source 2, the motor 4 will rotate counterclockwise to change-over a particular channel under reception to another. The voltage from the source 2 is applied through the resistors 5 and 6 to the base of the transistor 7 to render it non-conductive. Accordingly, the transistor 14 conducts so that the output of the AFT circuit 15 is not applied to the tuner 17, thus the AFT action being supressed.

In this way, according to the present invention, there is provided a simple circuit which is correlated to the motor for channel change-over, automatically and momentarily suppresses the AFT action irrespective of the rotational direction of the motor, and is free from an inconvenience which would occur at the time of channels being changed over.

Figure 16:
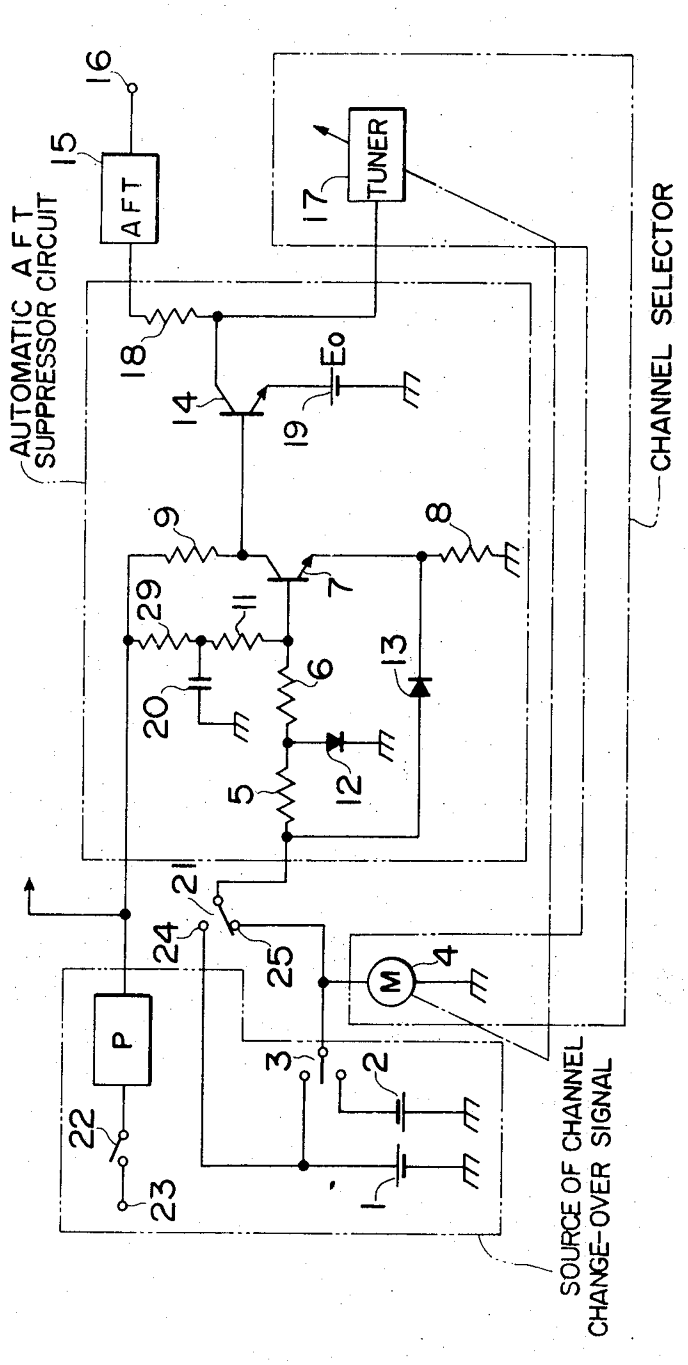
FIG. 16 is a schematic circuit diagram of a tuning system as third embodiment of the present invention.

FIG. 16 shows a further embodiment of the present invention. The embodiment is the combination of the embodiment shown in FIG. 15 with the idea of the embodiment shown in FIG. 7 and further includes a manually operated AFT suppressor switch. Therefore, in this embodiment shown in FIG. 16, the AFT action is automatically suppressed when the channels are changed over by means of the motor which is provided in the channel selector and can rotate in both the clockwise and counterclockwise direction, and the AFT action is suppressed not only automatically for a certain period of time after the closure of the power switch but also by means of the manual switch.

The same reference characters in FIG. 15 have been applied to like circuit elements in FIG. 16. And functions of these circuit elements are omitted herein. Additional elements in the embodiment of FIG. 16, which are not seen in the embodiment of FIG. 15, are a power terminal 23 in the source of channel change-over signal, a power switch 22, a power source P, a resistor 29 in the automatic AFT suppressor circuit, a capacitor 20, and an additional manually operated AFT suppressor switch 21.

The movable contact of the switch 21 is connected with the junction of the resistor 5 and the diode 13, and the stationary contact 24 of the switch 21 is connected with the voltage source 1 while the stationary contact 25 of the switch 21 is connected with the motor 4, i.e. the movable contact of the switch 3. The movable contact of the switch 21 is normally engaged with the stationary contact 25. In this condition, the AFT action is going on so far as the switch 3 is open. If the movable contact of the switch 21 is shifted to rest on the stationary contact 24, the voltage from the source 1 is applied to the automatic AFT suppressor circuit so that the AFT action is suppressed irrespective of the position of the movable contact of the switch 3.

The resistor 29, capacitor 20 and resistor 11 in FIG. 16 correspond respectively to the resistor 6, capacitor $C_1$ and resistor 8. Also, the power terminal 23, the power switch 22 and the power source P in FIG. 16 correspond respectively to the power terminal 1, power switch $SW_1$, and power source P. The functions of these elements or circuits have been described with the embodiment shown in FIG. 7.

Figure 17:
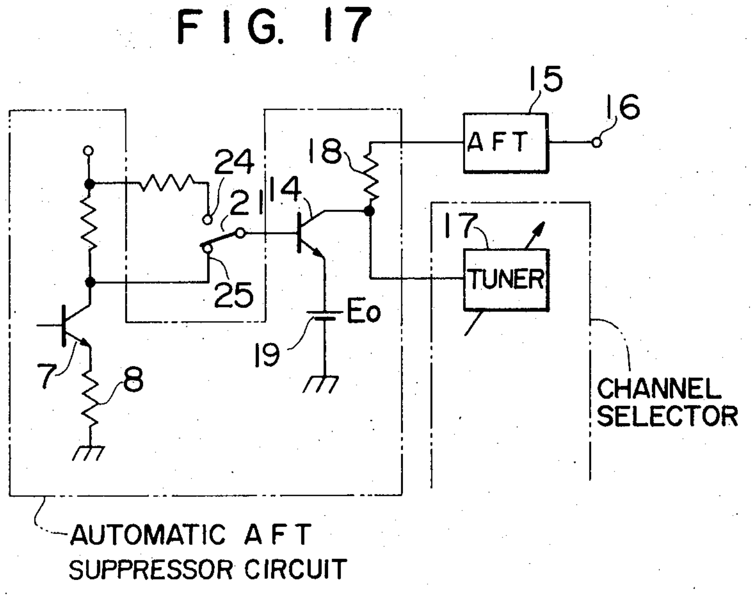
FIGS. 17 and 18 are schematic circuit diagrams of the variations on a part of the tuning system shown in FIG. 16.
Figure 18:
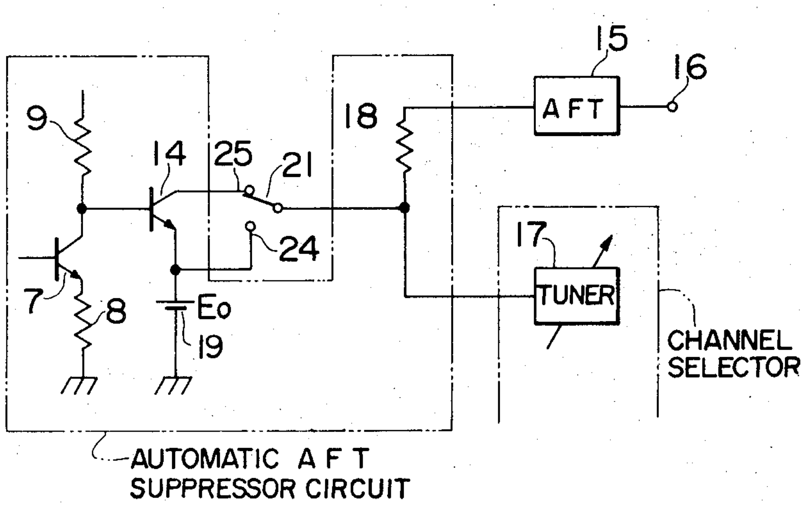

There are many other ways of providing a manual AFT suppressor circuit in the tuning system according to the present invention than that shown in FIG. 16. Two of them, for example, are shown in FIGS. 17 and 18, wherein the same reference characters indicate like circuit elements as in FIG. 16. In either case, the output voltage of the AFT circuit can be locked to a reference level $E_0$ not only when the AFT action is suppressed by means of the manual AFT suppressor switch but also when the AFT action is suppressed automatically, i.e. without use of the manual switch, for a certain period of time after the closure of the power switch or for a period of time during which the channel change-over operation is completed. Therefore, there is provided an advantage that the tuning voltage assumes one and the same constant value irrespective of the way of suppressing the AFT action while the AFT action is suppressed at all. In this way, a manually operated AFT suppressor means can easily and rationally be combined with an automatic AFT suppressor means.

In the above described embodiments, all the tuning circuits constituting each varactor tuner need not be composed of varactor diodes. For example, a varactor diode to provide an AFT action may be used only in the tuning circuit for the local oscillator of the tuner. It is not necessarily required to utilize an electric motor as a channel change-over driving mechanism, but other electrically operated apparatuses may be used. Further, there may be used a device which can change-over channels by the application of an electrical signal or voltage.

It should therefore be noted that the above mentioned embodiments are only illustrative examples and the invention is by no means limited to these embodiments and that other modifications, alterations and variations will be possible without departing the spirit and the scope of the invention. Hence, the present invention should be limited by the appended claims alone.

What is claimed is:

1. A tuning system comprising: a channel selector having a tuning element which determines a tuning frequency of said system in response to an electrical signal applied to said element; an AFT circuit which generates an AFT signal corresponding to each one of a plurality of channels to be tuned, said AFT signal being applied to said channel selector; an automatic AFT suppressor circuit; a signal source circuit comprising a power source for supplying power to said channel selector, said AFT circuit and said AFT suppressor circuit when said tuning system is to be tuned to any one of said channels; and means for selectively connecting and disconnecting said signal source circuit to and from said channel selector, said AFT circuit and said AFT suppressor circuit; said automatic AFT suppressor circuit comprising a switching element for preventing the AFT output signal of said AFT circuit from being applied to said channel selector, and a delay and hold circuit for driving said switching element for a predetermined period of time after said power source is connected to the channel selector, AFT circuit and AFT suppressor circuit of the tuning system, the voltage supplied from said power source being applied through said delay and hold circuit to said switching element to suppress the AFT output signal of said AFT circuit for the predetermined period of time after the connection of said power source to the system.

2. A tuning system according to claim 1, wherein said selector further comprises first means for supplying channel selecting signals to said tuning element, said channel selecting signals corresponding to the respective channels to be tuned, and second means including a motor coupled to said first means to supply said selecting signals to said tuning element one by one; said tuning system further comprising a motor energizing power source and motor switch means for connecting and disconnecting said motor to and from said motor energizing power source to enable and disable said motor, respectively; and wherein said motor switch means is coupled to said AFT suppressor circuit to drive said switching element in correspondence with the connection of said motor switch means to said motor to prevent the AFT signal of said AFT circuit from being applied to said tuning element for the predetermined period of time after the connection of said motor to said motor energizing power source.

3. A tuning system comprising: a channel selector having a tuning element which determines a tuning frequency of said system in response to an electrical signal applied to said element; an AFT circuit which generates an AFT signal corresponding to each one of a plurality of channels to be tuned, said AFT signal being applied to said channel selector; an automatic AFT suppressor circuit; a signal source circuit comprising a power source for supplying power to said channel selector, said AFT circuit, and said AFT suppressor circuit when said tuning system is to be tuned to any one of said channels; and means for selectively connecting and disconnecting said signal source circuit to and from said channel selector, said AFT circuit, and said AFT suppressor circuit; said automatic AFT suppressor circuit comprising a switching element for preventing the AFT output signal of said AFT circuit from being applied to said channel selector, and a delay and hold circuit for driving said switching element for a predetermined period of time after said power source is connected to the channel selector, AFT circuit and AFT suppressor circuit of the tuning system, the voltage supplied from said power source being applied through said delay and hold circuit to said switching element to suppress the AFT output signal of said AFT circuit for the predetermined period of time after the connection of said power source to the system; wherein said switching element comprises a transistor and said delay and hold circuit comprises an integrator circuit; and wherein the output of said AFT circuit is connected with the input of said channel selector, one of the collector and emitter of said transistor is connected with the junction of the output of said AFT circuit and the input of said channel selector, the other of the emitter and collector of said transistor is grounded through a resistor, the junction of said transistor and said resistor is connected with said power source, and the base of said transistor is connected through said integrator circuit with said power source.

4. A tuning system comprising: a channel selector having a tuning element which determines a tuning frequency of said system in response to an electrical signal applied to said element; an AFT circuit which generates an AFT signal corresponding to each one of a plurality of channels to be tuned, said AFT signal being applied to said channel selector; an automatic AFT suppressor circuit; a signal source circuit comprising a power source for supplying power to said channel selector, said AFT circuit and said AFT suppressor circuit when said tuning system is to be tuned to any one of said channels; and means for selectively connecting and disconnecting said signal source circuit to and from said channel selector, said AFT circuit, and said AFT suppressor circuit; said automatic AFT suppressor circuit comprising a switching element for preventing the AFT output signal of said AFT circuit from being applied to said channel selector, and a delay and hold circuit for driving said switching element for a predetermined period of time after said power source is connected to the channel selector, AFT circuit, and AFT suppressor circuit of the tuning system, the voltage supplied from said power source applied through said delay and hold circuit to said switching element to suppress the AFT output signal of said AFT circuit for the predetermined period of time after the connection of said power source to the system; wherein said selector further comprises first means for supplying channel selecting signals to said tuning element, said channel selecting signals corresponding to the respective channels to be tuned, and second means including a motor coupled to said first means to supply said selecting signals to said tuning element one by one; said tuning system further comprising a motor energizing power source and motor switch means for connecting and disconnecting said motor to and from said motor energizing power source to enable and disable said motor, respectively; and wherein said motor switch means is coupled to said AFT suppressor circuit to drive said switching element in correspondence with the connection of said motor switch means to said motor to prevent the AFT signal of said AFT circuit from being applied to said tuning element for the predetermined period of time after the connection of said motor to said motor energizing power source; and wherein said suppressor circuit comprises a transistor whose base and emitter are connected in parallel with said motor, and wherein the collector of said transistor is connected with the junction of the output of said AFT circuit and the intput of said channel selector, whereby the potential at said junction is maintained at a constant level upon the closure of said switch to suppress the AFT action of said AFT circuit.

5. A tuning system comprising: a channel selector having a tuning element which determines a tuning frequency of said system in response to an electrical signal applied to said element; an AFT circuit which generates an AFT signal corresponding to each one of a plurality of channels to be tuned, said AFT signal being applied to said channel selector; an automatic AFT suppressor circuit; a signal source circuit comprising a power source for supplying power to said channel selector, said AFT circuit, and said AFT suppressor circuit when said tuning system is to be tuned to any one of said channels; and means for selectively connecting and disconnecting said signal source circuit to and from said channel selector, said AFT circuit, and said AFT suppressor circuit; said automatic AFT suppressor circuit comprising a switching element for preventing the AFT output signal of said AFT circuit from being applied to said channel selector, and a delay and hold circuit for driving said switching element for a predetermined period of time after said power source is connected to the channel selector, AFT circuit, and AFT suppressor circuit of the tuning system, the voltage supplied from said power source being applied through said delay and hold circuit to said switching element to suppress the AFT output signal of said AFT circuit for the predetermined period of time after the connection of said power source to the system; wherein said selector further comprises first means for supplying channel selecting signals to said tuning element, said channel selecting signals corresponding to the respective channels to be tuned, and second means including a motor coupled to said first means to supply said selecting signals to said tuning element one by one; said tuning system further comprising a motor energizing power source and motor switch means for connecting and disconnecting said motor to and from said motor energizing power source to enable and disable said motor, respectively; wherein said motor energizing power source is one which can provide any one of voltages of positive and negative polarities, said motor is one which can change its direction of rotation depending upon the polarity of said voltages applied to said motor, and the order of provision of the channel selecting signal can arbitrarily be selected; wherein said switching element of said AFT suppressor circuit has a first terminal connected to said channel selector and to said AFT circuit and a second terminal connected to a DC power source to selectably apply one of the AFT signal and a constant DC voltage of said DC source to said channel selector; and wherein said AFT suppressor circuit further comprises a switching transistor to drive said switching element; and a circuit which is inserted between said switching transistor and said motor for changing the base and emitter potential of said switching transistor depending respectively upon said polarities of said voltages applied to said motor, and for causing said switching transistor to become conductive when said motor is not driven by said power source and for causing said switching transistor to become nonconductive when said motor is driven by said power source, whereby the AFT action of said AFT circuit is suppressed or started in response to the switching operation of said switching transistor.

6. A tuning system, comprising: a channel selector having tuning elements whose tuning frequency is determined by electrical control signals applied thereto; an AFT circuit for generating an AFT signal to be applied to said tuning elements in correspondence with a channel to be tuned; a first power supply for supplying power to said AFT circuit; a signal generator for generating a channel selecting signal to be applied to said tuning element in correspondence with the channel to be tuned; a motor for actuating said signal generator; a signal source, including a second power supply for supplying power to said motor switch means for coupling said motor to said second power supply, and means for providing a suppressor signal during the time said switch means couples said second power supply to said motor; and an AFT suppressor circuit coupled to said signal source and to said AFT circuit for preventing application of the AFT signal to said channel selector when said suppressor signal is provided from said signal source, wherein said AFT suppressor circuit comprises a switching element inserted between said AFT circuit and said second power supply, said switching element being coupled to and controlled by the output from said signal source, whereby the AFT action is suppressed by interrupting the power supplied for said AFT circuit when the suppressor signal of said signal source is being generated.

7. A tuning system according to claim 6, wherein said switching element is a transistor, one of the collector and emitter of said transistor is connected between said AFT circuit and the second power source to feed said AFT circuit, the other of the emitter and collector of said transistor is grounded; and the base of said transistor is coupled to the output of said information source.

8. A tuning system, comprising: a channel selector having tuning elements whose tuning frequency is determined by electrical control signals applied thereto; an AFT circuit for generating an AFT signal to be applied to said tuning elements in correspondence with a channel to be tuned; an IF signal generating circuit coupled to the input of said AFT circuit; a signal generator for generating a channel selecting signal to be applied to said tuning element in correspondence with the channel to be tuned; a motor for actuating said signal generator; a signal source, including a motor power supply for supplying power to said motor switch means for coupling said motor to said motor power supply, and means for providing a suppressor signal during the time said switch means couples said motor power supply to said motor; and an AFT suppressor circuit coupled to said signal source and to said AFT circuit for preventing application of the AFT signal to said channel selector when said suppressor signal is provided from said signal source, wherein said AFT suppressor circuit comprises a switching element inserted between said IF signal generating circuit and said AFT circuit, and said switching element is coupled to and controlled by the output of said signal source, whereby the AFT action of said AFT circuit is suppressed by interrupting said IF signal applied to said AFT circuit when the suppressor signal is being generated.

9. A tuning system according to claim 8, wherein said switching element comprises a transistor, one of the collector and emitter of said transistor is connected with the junction of the output of said IF signal generating circuit and the input of said AFT circuit, the other of the emitter and collector of said second transistor is grounded, and the output of said signal source is applied to the base of said transistor.

10. A tuning system, comprising: a channel selector having a channel selecting voltage providing circuit having a plurality of preset selecting voltages corresponding respectively to channels desired to be tuned, and a tuning element having variable capacitance diodes and connected to said channel selector to be supplied with a desired one of said selecting voltages; IF amplifier means connected to the output of said tuning element; and AFT circuit for generating an AFT signal to be applied to said tuning element in response to an output of said IF amplifier means; means for starting tuning operation of said selector, including a first power supply for actuating said selecting voltage providing circuit to provide the desired one of said selecting voltages and first switch means to incorporate said power supply into said system for generating a tuning signal for a predetermined period of time from said starting up to completion of said tuning; and an automatic AFT suppressor circuit for preventing the application of said AFT signal to said tuning element under control of said tuning signal.

* * * * *